United States Patent [19]
Pomeranz et al.

[11] 3,927,371
[45] Dec. 16, 1975

[54] TEST SYSTEM FOR LARGE SCALE INTEGRATED CIRCUITS

[75] Inventors: Jehoshua Naphtali Pomeranz, Suffern; Henri Daniel Schnurmann, Monsey, both of N.Y.

[73] Assignee: International Business Machines Corporation, Armonk, N.Y.

[22] Filed: Feb. 19, 1974

[21] Appl. No.: 443,284

[52] U.S. Cl. .......................... 324/73 R; 235/153 AC
[51] Int. Cl.² .................. G01R 15/12; G01R 31/30; G06F 11/00
[58] Field of Search ................. 324/73; 235/153 AC

[56] References Cited

UNITED STATES PATENTS

| | | | |
|---|---|---|---|
| 3,758,761 | 9/1973 | Henrion | 324/73 X |
| 3,777,129 | 12/1973 | Mehia | 324/73 X |
| 3,812,337 | 5/1974 | Crosley | 235/153 |

*Primary Examiner*—Alfred E. Smith
*Assistant Examiner*—Rolf Hille
*Attorney, Agent, or Firm*—Thomas F. Galvin

[57] ABSTRACT

A system for testing large scale integrated circuits. The circuitry in an integrated package such as a card, module or a semiconductor chip is viewed as a partially functional logic unit. This circuitry is complemented with off-package logic to allow the combination to act as a complete functional logic unit to which functional test patterns may be applied. The complementary logic is preferably simulated in the memory of a computer-controlled tester.

16 Claims, 11 Drawing Figures

| COMPUTER CONTROL INSTRUCTIONS FOR REPRESENTATION OF MISSING GATES | |
|---|---|
| LD 3<br>OR n+1<br>COMP<br>STO m+3 | LD 4<br>OR m+3<br>COMP<br>STO p+1, m+4 |

| COMPUTER CONTROL INSTRUCTIONS FOR REPRESENTATION OF MISSING GATES | | | |
|---|---|---|---|
| LD 2<br>OR 6<br>COMP<br>STO m+3 | LD 3<br>OR m+4<br>COMP<br>STO Y | LD 7<br>OR 1<br>OR Y<br>COMP | STO m+4 |

TEST SYSTEM FOR LARGE SCALE INTEGRATED CIRCUITS

BACKGROUND OF THE INVENTION

1. Field of the Invention

This invention relates generally to the testing of complex integrated circuits, in particular combinational logic circuits which need not be tested under real time conditions.

2. Description of the Prior Art

It is widely understood that a semiconductor manufacturer cannot afford to sell any product the performance of which is in doubt. Some manufactured products, such as relatively simple printed circuit boards and low density semiconductors are easily tested. Other, more complex devices are produced by simple or predictable processes so that the testing of a production lot can be accomplished by testing a representative sample of the lot. Modern integrated circuits do not fall into either of these categories. The most advanced of these circuits now comprises greater than 2,000 interconnected logic gates on a single semiconductor chip. Moreover, they are produced by process steps which have low or variable yields so that sample testing is impractical. Thus the design specifications of large scale integrated circuits can be verified only by the use of intricate test equipment featuring automatic test generation.

One system for testing such complex circuitry is the random number statistical logic test system described in a patent issued to Giedd, et al., U.S. Pat. No. 3,614,608 and assigned to the assignee of the present application. In that test system a random number generator simultaneously applies a plurality of signals in a random pattern to the plurality of input pins of a circuit under test and a perfectly operating reference circuit. Comparison circuitry is responsive to signals received from both circuits and provides another signal when two outputs are not matched. This system has been quite successful; however, the number of test patterns which must be generated is very large, as the reliability of the testing increases with the number of test patterns applied to the circuits.

Another technique which has been used frequently applies the path sensitizing concept to circuit testing. Typically, the logic analysis is carried out at the primitive block level and the test algorithms are based on a primitive level application of the path sensitizing concept which is not oriented to the design for functional aspects of the logic, such as shifting and counting. With the trend toward the aforementioned large scale integrated circuit chips, the logic becomes so complex that algorithms based on path sensitization are often unable to cope with it. The major reason is that the path sensitization approach cannot easily sustain itself through a long path at the primitive level block.

On the other hand, generating long sequences would become a simpler task if test patterns based on a circuit or system logical function could be applied to the chip. For example, in a 10-bit shift register, the 10th stage may be difficult to attain by sensitive path generation but would be relatively easy if the function of shifting were recognized and treated as such.

SUMMARY OF THE INVENTION

It is therefore a primary object of our invention to effectively test large scale integrated circuits more accurately with shorter sequences than heretofore possible.

This object and other objects and features of our invention are achieved by complementing the circuitry on each chip with off-chip logic to allow the combination to act as a complete functional logic unit. The circuitry on the chip is viewed as a partially functional logic unit. The combination of the chip logic and off-chip logic thereby forms a single functional unit to which functional test patterns may be applied. In the preferred embodiment the complementing function is achieved by simulating the necessary logic in the memory of a computer-controlled tester.

A feature of our invention is that the correct outputs of the partially functional unit in response to the functional test inputs may be identified. With this information, units of the same type may be tested without resort to the off-chip logic.

DESCRIPTION OF THE PREFERRED EMBODIMENT

Figure 1:
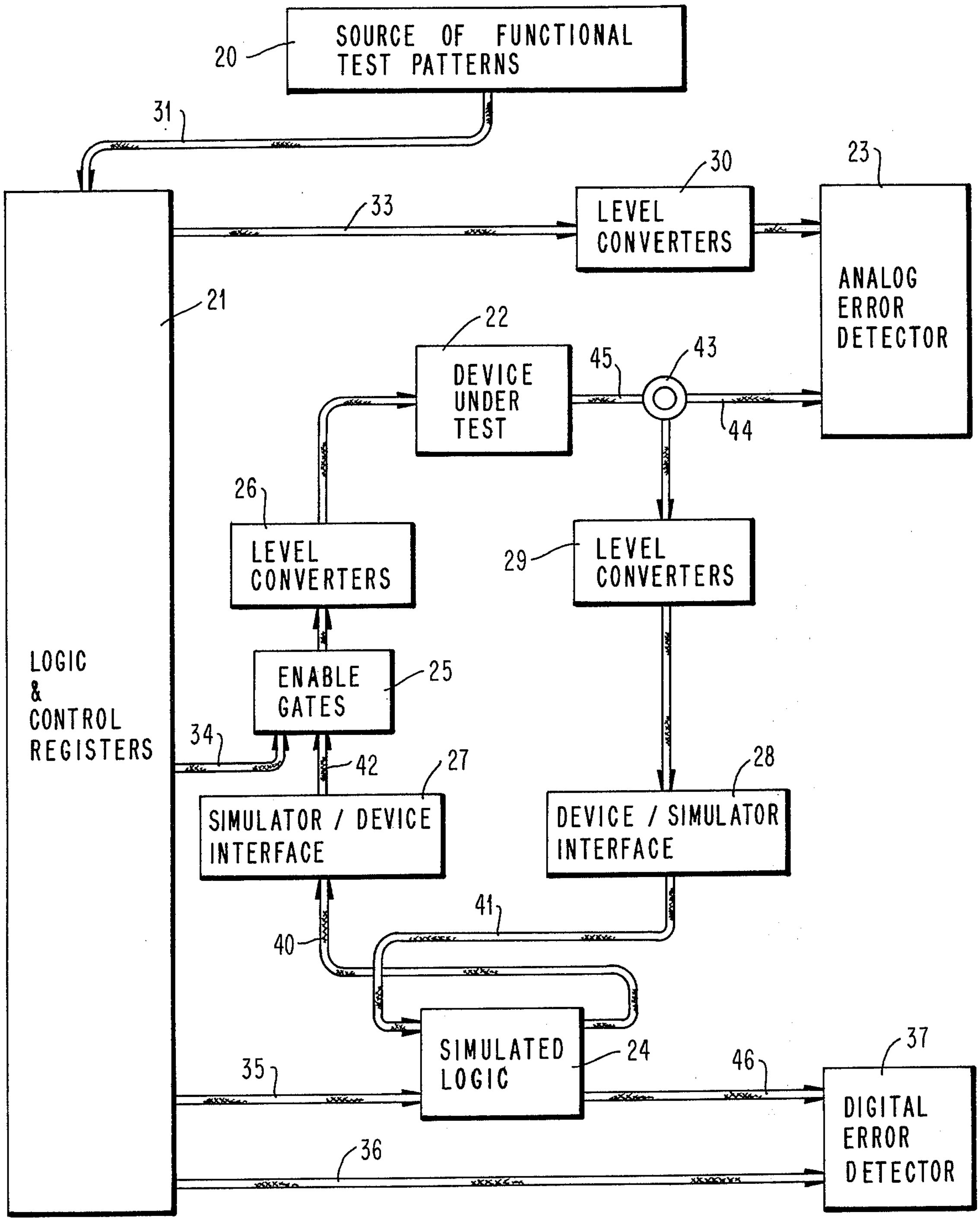
FIG. 1 is a generalized block diagram of our invention.

Referring now to the drawings in more detail, and particularly to FIG. 1, there is shown an arrangement for functionally testing a device 22 which is by itself incapable of performing a selected function. Examples of functional logic units contemplated by our invention are adders, counters, shift registers, decoders, majority circuits and the like, as well as combinations of those circuits.

Device 22 is complemented by simulated logic 24, which preferably comprises insructions generated from the memory of a computer (not shown), to form a functional logic unit. The combination of device 22 and logic 24 are together capable of generating output signals on lines 45 and 46 which are a function of the test patterns transmitted from source 20. To correspond with terms ordinarily used in the art, the test pattern signals are denoted as a functional test pattern and the output signals from a functional unit are denoted as an output functional pattern. Moreover, to differentiate between the output pattern from a functional unit and a non-functional unit, the output pattern from the latter is termed an output non-functional pattern.

In the preferred embodiment each of the patterns is generated sequentially in digital form and transmitted to logic and control registers 21. The circuits of block 21 serve to decode which input connections of the device under test 22 or simulated logic 24 are to be addressed by a particular bit in a test pattern, whether such signal is to be applied to an input pin or whether it is to be compared with a signal from an output pin, and the particular binary value of the signal.

Because the functional test patterns are in the form a binary signals and the test device 22 must be addressed by voltage levels, level converters 26, 29 and 30 are required to convert the binary signals to voltage levels and vice-versa. Thus, converters 26 perform a digital-to-analog conversion on the binary signals from registers 21; converters 29 perform an analog-to-digital conversion of the voltage levels from the output pins of device 22 to the input of simulated logic 24 and converters 30 convert the digital signals of the expected functional pattern from register 21 to analog signals to be compared with the outputs of device 22 at error detection block 23. Level conversions per se are well known to those of skill in the testing art and form no part of the present invention. Moreover, the particular arrangement of the converters in FIG. 1 is most often used in the test equipment field; but others are well within the scope of the invention.

As illustrated in FIG. 1, certain of the output connections of device 22 are associated with, or related to, the input connections 41 of simulated logic 24 through an interface block 28. Conversely, certain of the output connections logic 24 are related to the input connections of device 22 through an interface block 27. In this fashion, as will be shown in later sections of the specification with regard to particular circuits, the logic performed by blocks 22 and 24 are joined to create a functional logic network, which is responsive predictably to an input test pattern based on the function.

The input functional test pattern is selectively applied to the input connection of device-under-test 22 and simulated logic block 24 via cabling 34 and 35, respectively. The input signals on cabling 34 are converted to voltage levels via converters 26 and address the particular pin of device 22 which has been decoded in registers 21. Similarly, the digital test pattern addresses simulated logic 24 which generates outputs, based on the configuration of the logic, either on lines 46 or 40. If an output (digital) of simulated logic 24 is related to an input pin of device 22, the signal is transmitted via cable 40 through simulator/device interface means 27 and ENABLE gates 25. The digital signal is then converted to a voltage level by converters 26 and transmitted to the appropriate input pin of device 22. Conversely, if an output line of device 22 is related to an input line of logic block 24, the signal is transmitted via cable 45 and junction block 43 to level converters 29 where the voltage level is converted to a binary signal. The signal is transmitted through interface means 28 to the inputs of logic 24 via cable 41.

These respective inputs are then appropriately applied in device 22 or simulated logic 24 and cause signal outputs to be generated which are transmitted via cable 45 and 46, respectively, to error detection circuits. Test pattern source 20 also generates the expected output signals as a means for detecting whether the operation of device 22 is satisfactory.

Figure 2:
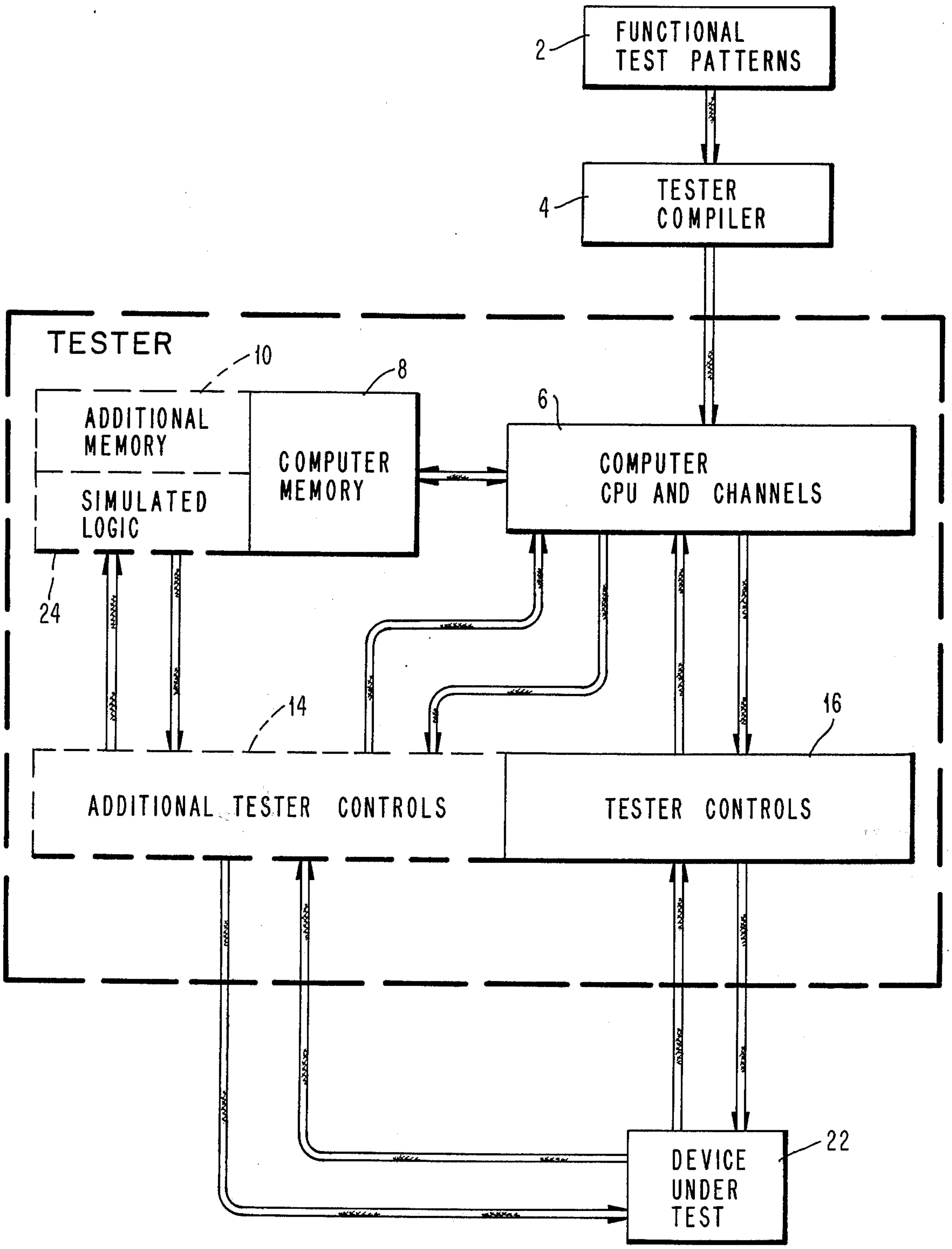
FIG. 2 is a generalized block diagram of a preferred embodiment of our invention which utilizes a computer-controlled tester.

As previously mentioned, the testing of integrated circuits is usually accomplished under the control of a computer due to the vast number of tests which must be performed and to the advantages of speed and accuracy. A block diagram of a computer-controlled tester modified in accordance with our invention is illustrated in FIG. 2. The functional test patterns used to address the functional circuit are stored on a tape or disk memory 2 in the form of a test program. The output from test pattern source 2 is then transmitted word-by-word or byte-by-byte to a compiler 4 which places the pattern in the format required by the tester. Computer 6, the heart of the tester, is a general purpose digital computer such as the Data General Corporation Nova. The memory of the computer stores the test program which includes power supply values, input/output pin configurations, pin reference levels and the actual test pattern. The use of a computer to perform these tasks in digital module testing is well known in the field. For example, the handbook entitled, "Model 4400 Digital Module Tester", published by Datatron, Incorporated, October 1970, describes a computer-driven tester.

In the present invention, a section of computer memory 8 or additional memory shown in dotted form in block 10 as well as the simulated logic 24 is required, as are additional tester controls 14, for interfacing with the device under test 22.

Thus, standard, commercially available computer-driven test systems, with appropriate additional equipment provided in accordance with our invention, can be used to construct our system.

Figure 3A:
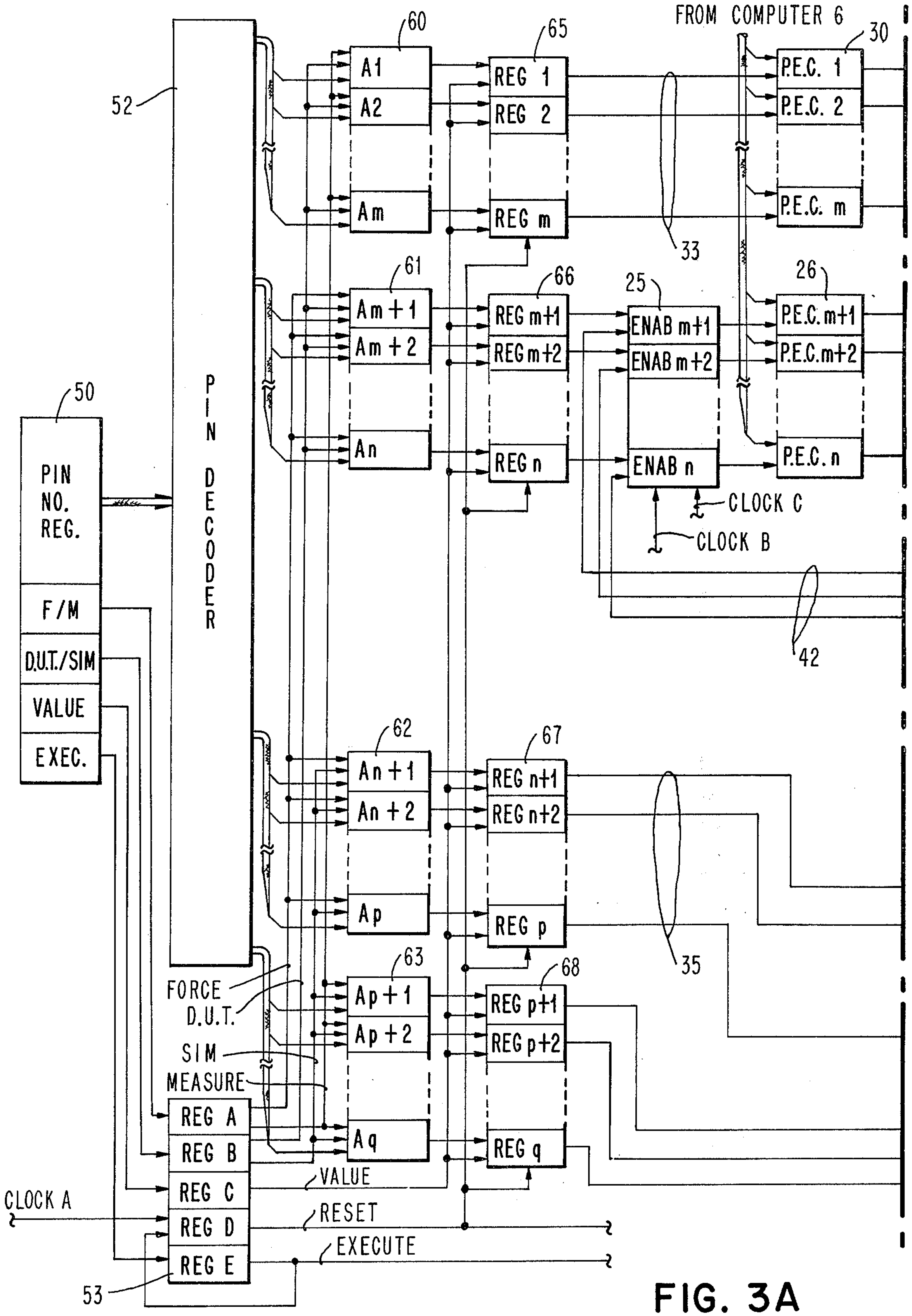
FIG. 3 is a more detailed block diagram of the generalized diagram shown in FIG. 1.
Figure 3B:
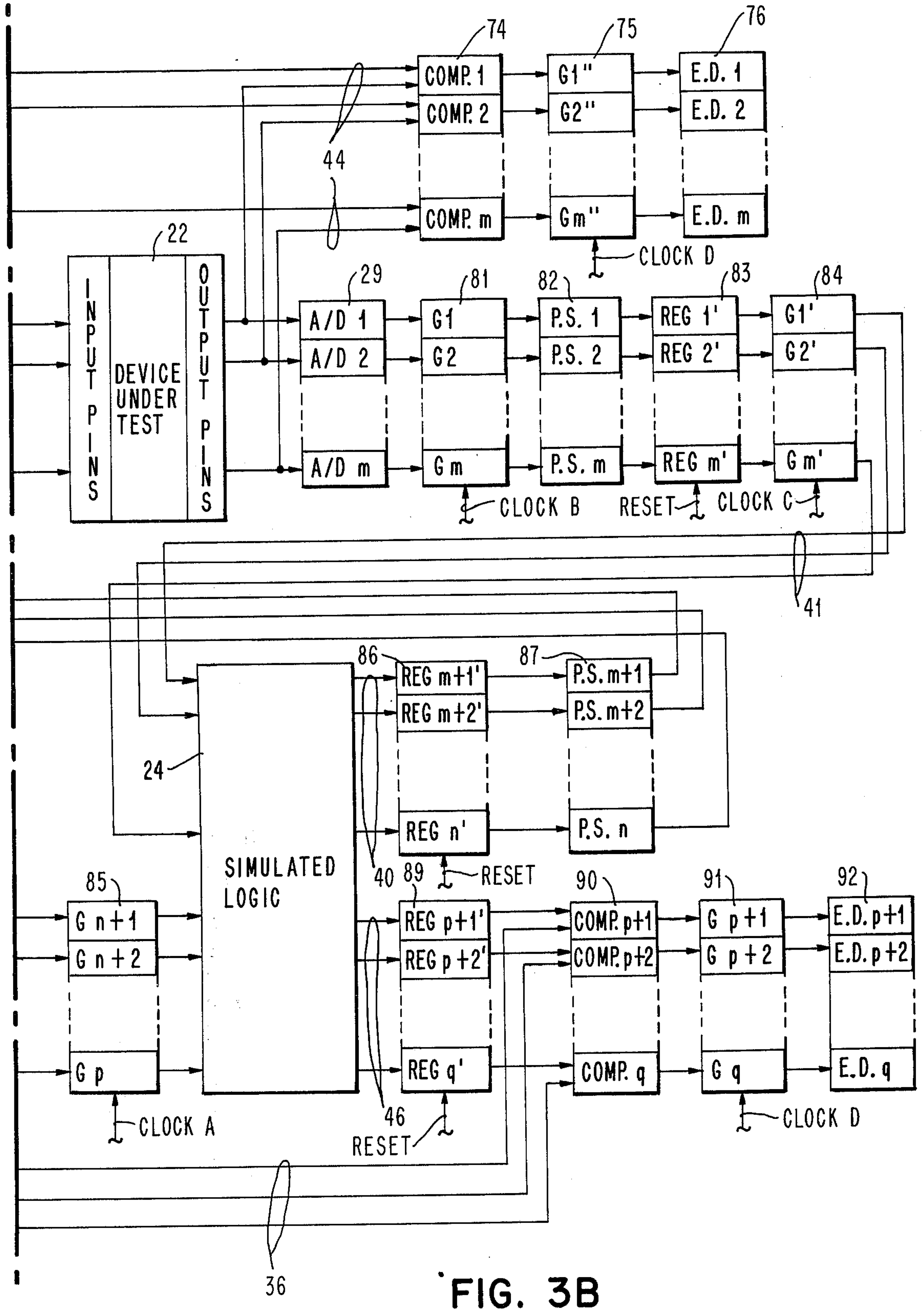

FIGS. 3A and 3B represent a detailed block diagram of the generalized diagram of FIG. 1. The test pattern from the test pattern source contains digital information regarding: the pin number to be addressed by each test; the value of the bit; whether device 22 or simulated logic 24 is to be addressed (DUT/Sim); whether the data is to be forced on an input or measured from an output (f/m); and whether the instruction is to be executed or not (EXEC). The pin number identification is transmitted from the pin register to pin decoder 52, the output of decoder being transmitted to a single one of four sets of AND gates 60, 61, 62 and 63. The gates are also addressed by the outputs from the F/M latch A and DUT/Sim latch B.

This addressing scheme establishes gates $A_1$–$A_m$ as being associated with measuring the outputs of device 22. Gate $A_{m+1} - A_n$ are associated with forcing data on the inputs device 22. Gates $A_{n+1} - A_p$ are associated with forcing data on the inputs of simulated logic network 24; and gates $A_{p+1} - A_q$ are associated with measuring the simulated logic outputs. Assuming that the tester is equipped to test devices with up to 256 pins, then the total number of AND gates responsive to decoder 52 is 256. This number may be appropriately apportioned between the device 22 and simulator logic 24 depending on the requirements of the particular device under test and the complementary function to be simulated in logic network 24.

The outputs from these AND gates activate registers 65, 66, 67 and 68, so as to store the value of the bit stored in VALUE latch C. Data is gated from the registers upon the initiation of a RESET pulse from Reg. D, which is a conventional monostable multivibrator.

Decoder 52, AND gates 60 – 63, latches 53 and registers 65 – 68 correspond to block 21 of FIG. 1.

Binary data from registers 65 is converted to analog voltage and/or current levels at pin electronic cards (PEC) 30. The configuration of a PEC is further described with regard to FIG. 6. However, all that is required for a sufficient understanding is that one of the functions performed by each PEC is digital-to-analog conversion. The voltage from the converter is transmitted to analog comparators 74 where the output voltage from the device under test is compared with the desired voltage from converter 30. An output signal from comparators 74 is transmitted through gates 75 to error detectors 76 upon the initiation of an appropriate clock pulse D. Gates 75 are preferably AND gates which are activated by the simultaneous reception of a pulse from an associated comparator and a clock pulse D. Comparators 74, Gates 75 and error detectors 76 correspond to block 23 of FIG. 1.

Data to be forced on the input pins of device 22 is transmitted through registers 66 and ENABLE gates 25 to pin electronic cards 26 which convert the digital data to voltage levels to exercise the circuitry in device 22. As will be described in a succeeding section of this specification, ENABLE gates 25 are also responsive to those output lines of simulated logic 24 which are related to certain input pins of device 22.

The operation of registers 67 and 68 in conjunction with gates 62 and 63, respectively, are similar to those already described except that, because the simulated logic receives data in digital form, there is no need for level conversion by pin electronic cards. Thus the inputs to simulated logic 24 from pin decoder 52 need only be gated at gate circuits 85 by a clock pulse A. Some of the outputs from simulated logic 24 represent and take the place of hardware output pins in the fully functional circuit. These outputs are gated through registers 89 where they are compared with the expected data in digital comparators 90. An output from comparators 90 is gated through gates 91 to digital error detectors 92.

Simulator/device interface 27 of FIG. 1 comprises registers 86 and programmable switches 87 in FIG. 3B. Certain outputs from simulatd logic 24 are related to certain input pins of device 22. To provide a system capable of testing a wide range of device types, programmable switches 87 equal in number to the input pins of device 22 are provided. However, in most cases far fewer outputs from simulated logic 24 will actually be used, as will become clear when discussing specific embodiments of devices and simulated logic which may be tested by our invention. Programmable switches 87 are therefore set for each device type according to the number of outputs to be generated from logic block 24 which are related to certain input pins of device 22. Thus, for example, if only two logic outputs were required to substitute for inputs of device-under-test 22, only two switches, e.g., $PS_{m+4}$ and $PS_{m+5}$ would be set to transmit data through $REG_{m+4}$, and $REG_{m+5}$, to gates $ENAB_{m+4}$ and $ENAB_{m+5}$. The other programmable switches would remain in the open position.

Device/simulator interface 28 of FIG. 1 comprises, in FIG. 3, gates 81, programmable switches 82, registers 83 and gates 84. As with simulator/device interface 27, there is a programmable switch to the inputs of the simulator logic network from every output pin, even though there will generally be fewer inputs to the logic than there are output pins.

Figure 4:
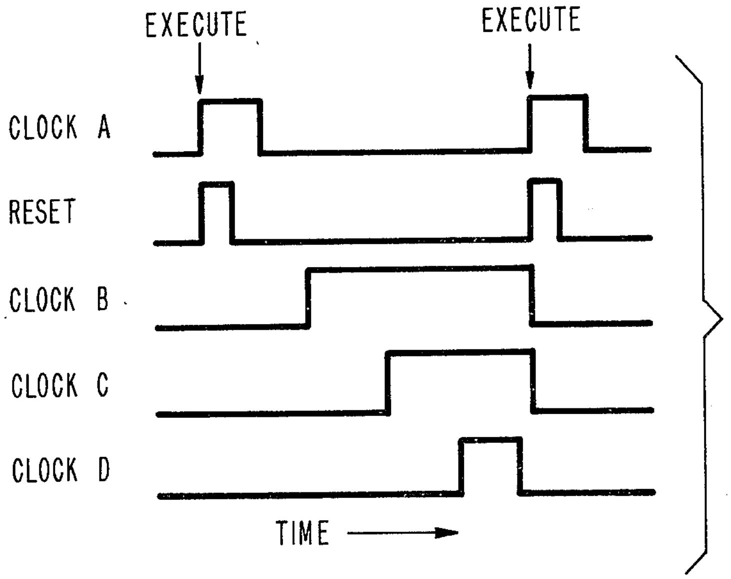
FIG. 4 is a diagram of waveforms showing the timing of the system of FIG. 3.

FIG. 4 is a timing diagram illustrating the signal flow through the system of FIGS. 3A and 3B. Clock pulse A, in conjunction with the execute pulse (EXEC) within the test pattern, generates a RESET pulse from latch D shown in block 53 of FIG. 3A. The RESET pulse resets all registers in the test system. Clock pulse A also gates data held in registers 67 through gates 85 to the inputs of simulated logic 24. As will be clear to those familiar with computer-driven test systems, the execute pulse within the test pattern is redundant with respect to the clock pulse A and is not necessary.

Since each data bit in the test pattern is gated through the system during each cycle, there is no need for both the execute and the clock pulse A in the system. An execute pulse is necessary only when more than 1 bit of data is to be accumulated in the registers and transmitted in parallel fashion. This is not the case in our system, where each segment of the test pattern, which includes 1 test data bit, is transmitted in serial fashion. However, because the standard computer-controlled test systems are ordinarily provided with these features, they have been illustrated in the specification so as to better relate our invention to well known computer-driven test systems.

Figure 5:
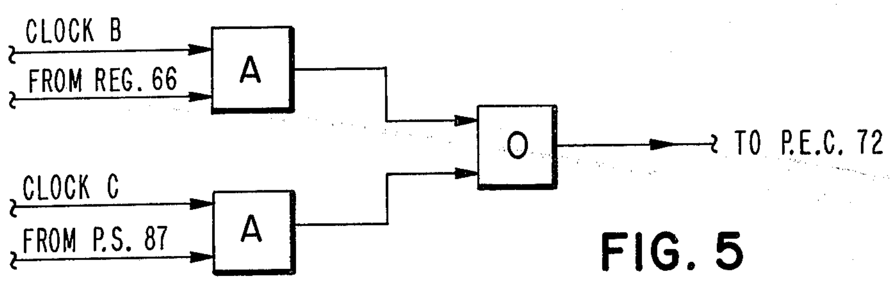
FIG. 5 illustrates a preferred embodiment of the ENABLE circuit of FIG. 3.

Clock pulses B and C operate gates 81 and 84, respectively, of the device/simulator interface between the output pins device 22 and input lines 41 to logic block 24. Clock pulses B and C also gate data through ENABLE gates 25, an operation which will be better understood when FIG. 5 is considered. Clock pulse D gates outputs from Comparators 74 and 90 through gates 75 and 91 to error detectors 76 and 92.

FIG. 5 is a more detailed diagram of ENABLE circuits 25 than FIGS. 1 and 3A. EAch ENABLE circuit, such as $ENAB_{m+1}$, comprises a pair of AND gates having outputs connected to an OR gate which in turn has an output connected to an associated pin electronics card 26, viz., $PEC_{m+1}$. Thus, the input pin of device 22 addressed by ENABLE circuit 25 through the associated PEC circuit 26 can be activated either from the pin decoder through registers 66 during a clock B cycle or from the output of simulated logic 24 through the associated programmable switch 87 during a clock C cycle.

Figure 6:
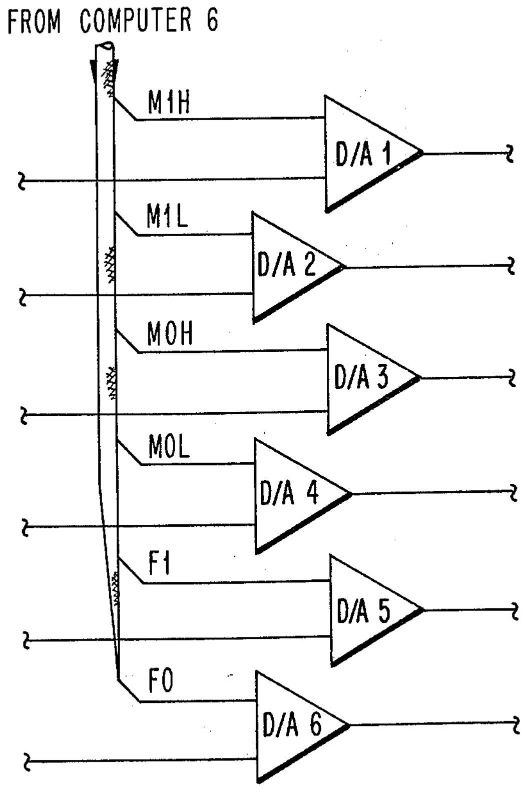
FIG. 6 illustrates a preferred embodiment of the pin electronics card (P.E.C.) of FIG. 3.

FIG. 6 illustrates the relevant circuitry of a pin electronics card, PEC. These circuits provide the capability to individually program test parameters on a per-pin basis under control of the computer. Six different reference levels may be programmed for each pin, two of them denoted F1 and F0, being binary forcing functions; the remaining four levels M1H and M1L, and M0H and M0L establish two pair of high and low limits, respectively, to define monitoring windows. Each PEC in block 30, being utilized for measurement, requires only D/A1 – D/A4 in FIG. 6; each PEC in block 26 would require only D/A5 and D/A6 for operation in our preferred embodiment. The use of pin electronics cards in test equipment is well known at the present state of the art and no claim is made to them as part of our invention. Other more or less complicated circuits could be used in their place to achieve the same goals.

Operation of the Invention

The operation of our invention can best be appreciated in the following examples which consider the circuits illustrated in FIGS. 7, 8, 9 and 10 in conjunction with the test system of FIGS. 3A and 3B and the timing diagram of FIG. 4.

Figures 7, 8:
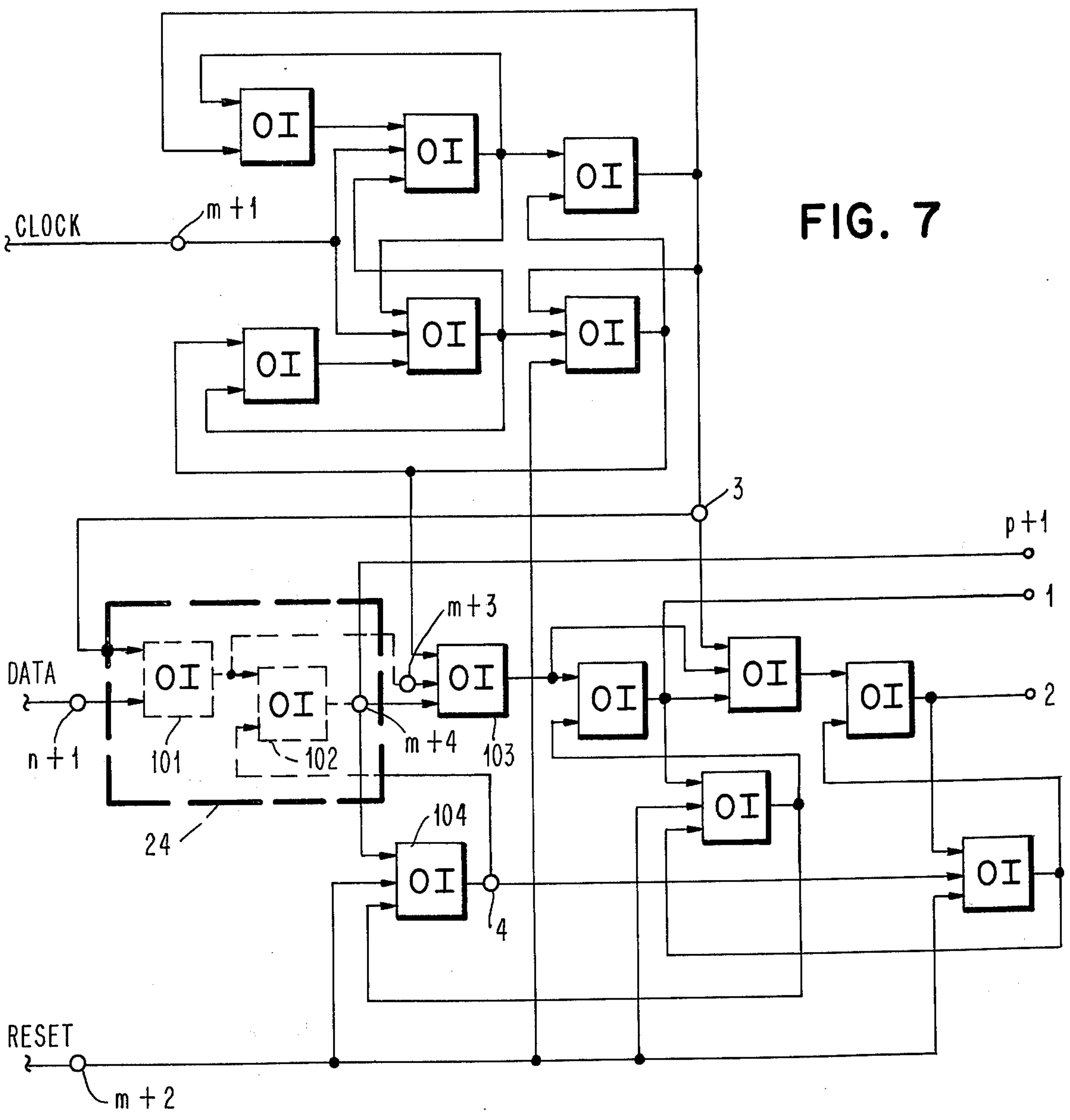
FIG. 7 is a circuit diagram of a partially functional three-position shift register which may be tested in accordance with the present invention.
FIG. 8 represents the instructions generated by the computer shown in FIG. 2 for representation of the gates shown in dotted lines in FIG. 7.

The circuit illustrated in FIG. 7 is a three-stage shift register of standard design driven by a binary trigger.

As fabricated on an integrated circuit chip, however, the gates shown as dotted lines in the circuit are not available on integrated circuit chip 22. To make the circuit on the chip amenable to functional testing, the missing circuits are simulated in the simulated logic section 24 of our test system, the combination of the two making it appear that the circuit is fully functional as a shift register. The circuit may then be tested by a functional test pattern shown in Table I. This shift register functional test pattern is well known and forms no part of our invention.

TABLE I

FUNCTIONAL TEST PATTERNS FOR SHIFT REGISTER OF FIG. 7

| | INPUTS | | | OUTPUTS | | |
|---|---|---|---|---|---|---|
| FUNCTION: | CLOCK | RESET | DATA | SR1 | SR2 | SR3 |
| PIN NO.: | m+1 | m+2 | n+1 | p+1 | 1 | 2 |
| | 1 | 1 | 1 | 1 | 1 | 1 |
| | 1 | 0 | 1 | 1 | 1 | 1 |
| | 0 | 0 | 1 | 1 | 1 | 1 |
| | 0 | 0 | 0 | 0 | 1 | 1 |
| | 0 | 0 | 1 | 0 | 1 | 1 |
| | 1 | 0 | 1 | 0 | 1 | 1 |
| | 0 | 0 | 1 | 1 | 0 | 1 |
| | 1 | 0 | 1 | 1 | 0 | 1 |
| | 0 | 0 | 1 | 1 | 1 | 0 |
| | 1 | 0 | 1 | 1 | 1 | 0 |
| | 0 | 0 | 1 | 1 | 1 | 1 |

In Table I the clock, reset and data input pins are denoted *m*+1, *m*+2, and *n*+1, respectively, in accordance with the notation used with respect to FIGS. 3A and 3B. Because the data line serves as an input to simulated logic 24, the data input is through registers 62. In like manner, the shift register outputs SR2 and SR3 are denoted as pins 1 and 2, whereas line SR1, being an output of simulated logic 24 is denoted as *p*+1.

In similar fashion, the device/simulator interface line between circuits 104 and 102 is denoted as pin 4; the simulator/device interface line between circuits 101 and 103 is denoted as *m*+3; and the simulator/device interface between circuits 102 and 104 is denoted as *m*+4. This last output line corresponds to simulator output line *p*+1. Hence, simulated logic block generates outputs to registers *m*+3', *m*+4' and *p*+1'.

FIG. 8 illustrates the programming instructions for simulating the circuit represented by the phantom logic of FIG. 7 so that all gate inputs and all gate outputs in the simulation are represented as being at one of the two binary levels. The programming instructions which read down and from left to right are self-evident but will be elaborated on as follows:

Load 3
OR *n*+1 with 3
Complement the OR'd results
Store *m*+3
Load 4
OR *m*+3 with 4
Complement the OR'd results
Store *p*+1 and store *m*+4.

Relating the circuit of FIG. 7 to FIGS. 3A and 3B: the serial outputs from pin decoder 52 address gates A1, A2, A*m*+1, A*m*+2, A*n*+1 and A*p*+1 of blocks 60 – 63. Output terminals 3 and 4 of device 22 are connected to their related input terminals of logic 24 via the device/simulator means through A/D converters 3 and 4 in block 29 and the corresponding circuits in blocks 81 – 84. Similarly, output terminals *m*+3 and *m*+4 of logic 24 are connected to their related input pins of device 22 via the simulator/device means through registers *m*+3' and *m*+4' and switches *m*+3 and *m*+4.

Figures 9, 10:
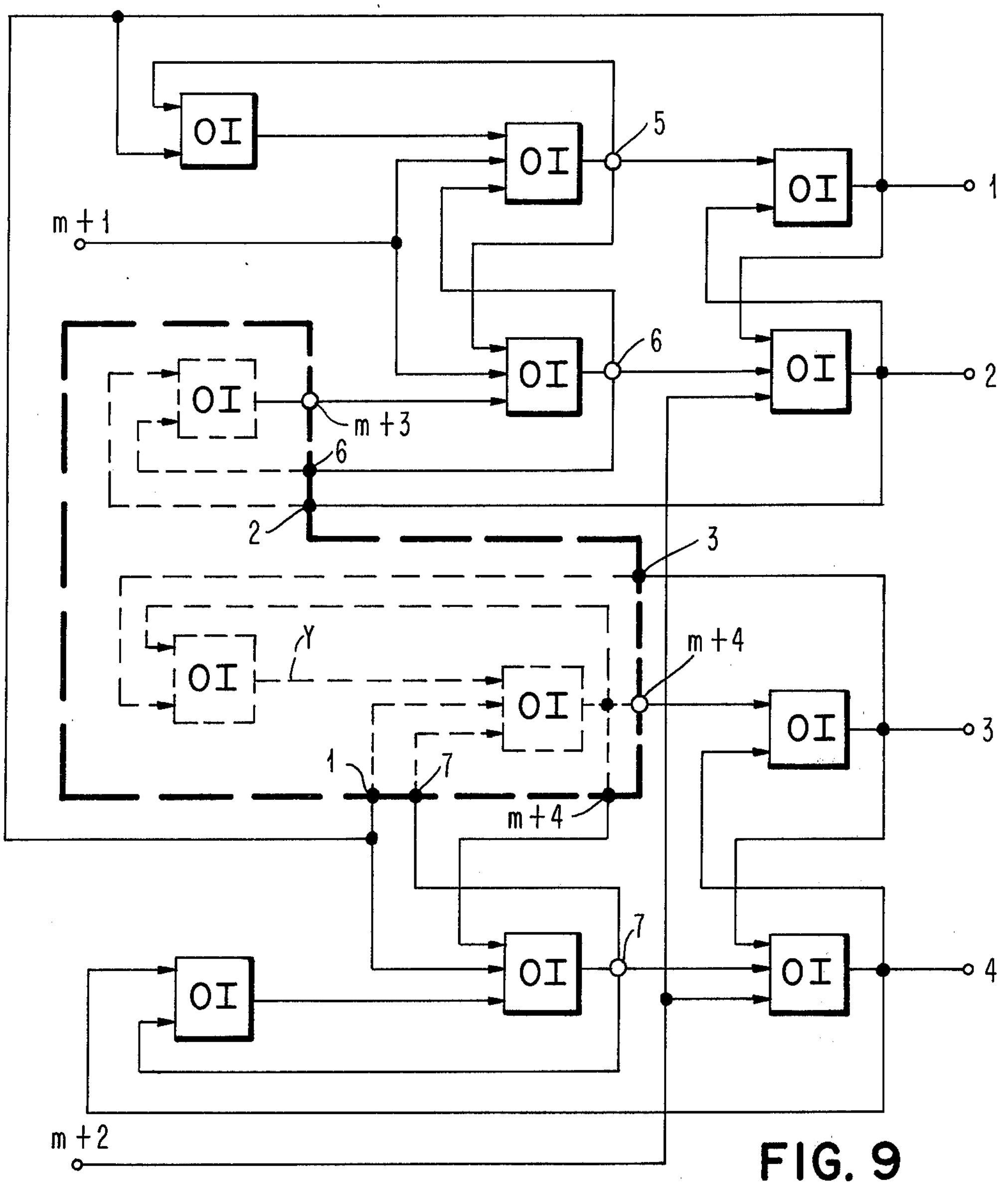
FIG. 9 is a circuit diagram of a partially functional binary counter which may be tested in accordance with the present invention.
FIG. 10 represents the instructions generated by the computer shown in FIG. 2 for representation of the gates shown in dotted lines in FIG. 9.

The circuit of FIG. 9 is another incomplete hardware circuit which can nevertheless be functionally tested by means of our invention. The complete circuit is a binary counter of standard design and operation. The gates shown in dotted lines in the figure are not available on integrated circuit chip 22, (module, printed circuit card, etc.) To functionally test the circuit, the missing circuits are simulated in the simulated logic section 24 of our test system, the combination of the two making it appear that the circuit is fully functional as a binary counter. The circuit may then be tested by the functional test pattern shown in Table 2, such pattern being well known to those of skill in the testing art and forming no part of our invention.

TABLE II

FUNCTIONAL TEST PATTERNS FOR BINARY COUNTER OF FIGURE 9

| | INPUTS | | OUTPUTS | | | |
|---|---|---|---|---|---|---|
| PIN NO.: | m+2 | m+1 | 1 | 2 | 3 | 4 |
| | 1 | 1 | 1 | 0 | 1 | 0 |
| | 0 | 1 | 1 | 0 | 1 | 0 |
| | 0 | 0 | 0 | 1 | 0 | 1 |
| | 0 | 1 | 0 | 1 | 0 | 1 |
| | 0 | 0 | 1 | 0 | 0 | 1 |
| | 0 | 1 | 1 | 0 | 0 | 1 |
| | 0 | 0 | 0 | 1 | 1 | 0 |
| | 0 | 1 | 0 | 1 | 1 | 0 |
| | 0 | 0 | 1 | 0 | 1 | 0 |
| | 0 | 1 | 1 | 0 | 1 | 0 |
| | 0 | 0 | 0 | 1 | 0 | 1 |

The binary counter has two device input terminals, denoted *m*+1 and *m*+2, and four device output terminals, denoted 1, 2, 3 and 4; this notation follows the terminology used for FIG. 3. Three other device output terminals, denoted 5, 6, and 7, must also be probed; they form the input terminals via the device/simulator interface to the simulated circuit shown in dashed lines. Two output terminals from logic 24, denoted as *m*+3 and *m*+4, also function as input pins of device 22 via the simulator/device interface.

FIG. 10 illustrates the programming instructions simulating the circuit represented by the phantom logic of FIG. 9 so that all gate inputs and all gate outputs in the simulation are represented as being one of the two binary levels. As with the programming instructions discussed with respect to FIG. 7, the following instructions read down and from left to right:

Load 2
OR 6
Complement the OR'd Results
Store *m*+3
Load 3
OR *m*+4
Complement the OR'd Results
Store Y
Load 7
OR 1
OR Y
Complement the OR'd Results
Store *m*+4

Relating the circuit of FIG. 9 to FIGS. 3A and 3B: The serial outputs from pin decoder 52 address gates A1, A2, A3, A4, Am+1, Am+2, only. None of the gates shown in blocks 62 and 63 are required. Because output terminals of logic block 24 are connected to related input pins on device 22, ENABLE gates *m*+3 and *m*+4 in block 25 are addressed through the appropriate registers and programmable switches in blocks 86 and 87 of FIG. 3B. Similarly, certain of the output pins from Device 22 are connected to related input terminals of logic block 24 via the device/simulator interface means, through A/D converters 5, 6, and 7 in block 29, and the corresponding circuits in blocks 81 –84.

One advantageous feature of our invention is that partially functional devices may be tested in response to a functional input test pattern without resort to the simulated logic. Assume, for example, that there is a production lot of devices to be tested. For example, a lot may consist of a quantity of partially functional shift registers as shown in FIG. 7. The first one of the lot or a known perfect device may be tested in accordance with the operation of the invention previously described. The output readings taken during the test are supplemented by also reading and recording the device/simulator interface signals and the simulator/device interface signals in addition to the output functional test pattern. With this supplementary data, the partially functional devices may be tested alone as if they were fully functional.

Thus, with respect to the shift register of FIG. 7, besides recording the functional output signals $p+1$, 1 and 2 in response to each increment of the functional test pattern, the signals from terminals 3 and 4 of the device/simulator interface are also recorded in response to the same pattern. These particular device output terminals transmit signals to related input terminals of the simulated logic. Similarly, the signals at terminals $m+3$ and $m+4$ of the simulator/device interface are recorded in response to the input functional test pattern. (Terminal $m+4$ corresponds to terminal $p+1$.) These logic output terminals transmit signals to related input terminals of the device.

The signals from the device/simulator interface supplement the output functional test pattern. The combination of these signals can conveniently be termed the output non-functional test pattern. Conversely, the signals from the simulator/device interface supplement the functional input test pattern. The combination of these signals is conveniently termed the input non-functional test pattern.

Having recorded this additional information, the remaining partially functional devices of the production lot may be tested by:

1. applying the non-functional input test pattern to the appropriate input terminals of device under test. These include the functional input terminals as well as those device input terminals which had been related to output terminals of the simulated logic;
2. reading and recording the non-functional output test pattern from the appropriate output terminals of the device under test. These include the functional output terminals as well as those device output terminals which had been related to the input terminals of the simulated logic; and
3. comparing the output non-functional pattern with the expected output test pattern generated from the known perfect device.

Therefore, the remaining partially functional shift registers (illustrated in FIG. 7) of a given production lot may be tested by applying the standard input functional test pattern on lines $m+1$ and $m+2$ plus the supplemented test pattern on lines $m+3$ and $m+4$ and by reading the output functional test pattern on terminals $p+1$, 1 and 2 plus the signals on terminals 3 and 4. The data input, $n+1$, is unnecessary because the simulated logic has been removed.

While the invention has been shown and particularly described with reference to preferred structures, it will be understood by those skilled in the art that various changes in form and detail may be made therein without departing from the spirit and scope of the invention.

We claim:

1. A system for testing a complex logic circuit which may be characterized as a partially functional circuit comprising:

a source of a functional test pattern;

a logic simulator having functional properties complementary to said partially functional circuit;

means for selectively applying said test pattern to input terminals of said partially functional circuit and said logic simulator;

first interface means resonsive to signals from predetermined output terminals of said partially functional circuit for applying said output signals to related input terminals of said logic simulator;

second interface means responsive to signals from predetermined output terminals of said logic simulator for applying said output signals to related input terminals of said partially functional circuit;

said partially functional circuit and said logic simulator being interconnected by said first and second interface means to form a fully functional circuit; and means responsive to output signals from the output terminals of both said partially functional circuit and said logic simulator for generating indications of the output signal pattern generated by said partially functional circuit and said logic simulator in response to said functional test pattern.

2. A system as in claim 1 wherein said source of functional test patterns also generates an output signal pattern expected to be generated from said partially functional circuit and said logic simulator output terminals and further comprising:

means for comparing said expected pattern with said actual pattern.

3. A system as in claim 2 and further comprising:

error detection means responsive to said comparing means for indicating an error when said expected pattern is different from said actual pattern.

4. A system as in claim 1 wherein said first interface means comprises:

means for connecting each output terminal of said partially functional circuit to the input terminals of said logic simulator; and programmable switch means for connecting only said predetermined output terminals of said logic simulator.

5. A system as in claim 4 wherein:

the output signals from said partially functional circuit are voltage levels; and said first interface means includes first level conversion means for converting said voltage level signals to binary signals to which said simulated logic circuit is responsive.

6. A system as in claim 1 wherein said second interface means comprises:

means for connecting each output terminal of said logic simulator to the inputs terminals of said partially functional circuit; and programmable switch means for connecting only said predetermined output terminals of said logic simulator to said related input terminals of said partially functional circuit.

7. A system as in claim 6 wherein:

the output signals from said logic simulator are binary signals; and said second interface means includes second level conversion means for converting said binary signals to voltage level signals to which said partially functional circuit is responsive.

8. A system as in claim 1 wherein said source of functional test pattern generates binary test signals, said logic simulator is responsive to binary signals, said partially functional circuit is responsive to voltage level signals, and further comprising:

first digital-to-analog conversion means for converting binary signals from said applying means into voltage level signals to which said partially functional circuit is responsive.

9. A system as in claim 8 wherein said source of a functional test pattern also generates a binary output signal pattern expected to be generated from said partially functional circuit and said logic simulator output terminals and further comprising:

second digital-to-analog conversion means for converting that portion of said output pattern expected to be generated from said partially functional circuit into voltage level signals;

analog comparison means for comparing said voltage level signals of said expected pattern with the actual output pattern generated by said partially functional circuit; and binary comparison means for comparing that portion of said output pattern expected to be generated from said logic simulator with the actual output pattern generated by said logic simulator.

10. A system as in claim 9 and further comprising:

analog error detection means responsive to output signals from said analog comparison means for indicating an error when said expected pattern of voltage level signals is different from said actual pattern of voltage level signals; and binary error detection means responsive to output signals from said binary comparison means for indicating an error when said expected pattern of binary signals is different from said actual pattern of binary signals.

11. A system for testing a complex logic circuit which may be characterized at a partially functional circuit comprising:

a source of a functional test pattern;

a logic simulator having functional properties complementary to said partially functional circuit;

means for selectively applying said test pattern to input terminals of said partially functional circuit and said logic simulator;

first programmable switch means for connecting predetermined output terminals of said partially functional circuit to related input terminals of said logic simulator;

second programmable switch means for connected predetermined output terminals of said logic simulator to related input terminals of said partially functional circuit; and means responsive to output signals from the output terminals of both said partially functional circuit and said logic simulator for generating indications of the output signal pattern generated by said partially functional circuit and said logic simulator in response to said functional test pattern.

12. A system as in claim 11 wherein said source of functional test patterns also generates an output signal pattern expected to be generated from said partially functional circuit and said logic simulator output terminals and further comprising:

means for comparing said expected pattern with said actual pattern.

13. A system as in claim 12 and further comprising:

error detection means responsive to said comparing means for indicating an error when said expected pattern is different from said actual pattern.

14. A method for testing a complex logic circuit which may be characterized as a partially functional circuit comprising:

providing a logic simulator having functional properties complementary to said partially functional circuit;

interconnecting predetermined output terminals of said partially functional circuit to related input terminals of said logic simulator;

interconnecting predetermined output terminals of said logic simulator to related input terminals of said partially functional circuit whereby said interconnected partially functional circuit and logic simulator form a fully functional circuit having functional input and output terminals;

applying a functional test pattern selectively to said functional input terminals;

said test pattern being designed to exercise said fully functional circuit to cause it to perform the desired function;

reading output signals from said functional output terminals to determine the response of said circuit to said input functional test pattern; and comparing said response to an expected output functional test pattern to determine whether there is a difference between the expected pattern and the actual pattern.

15. A method as in claim 14 wherein said complex logic circuit is one of a production lot of circuits having the same logic and electrical properties and further comprising the steps of:

reading signals from said predetermined output terminals of said logic simulator, the combination of said input functional test pattern and said simulator signals comprising an input non-functional test pattern; and reading signals from said functional output terminals as well as from said predetermined output terminals of said partially functional circuit, the combination of said signals comprising an output non-functional test pattern.

16. A method as in claim 15 wherein the remainder of said production lot of partially functional circuits are tested by the steps of:

applying said input non-functional test pattern to, and reading output response signals from, the partially functional circuit under test; and comparing said response to an expected output non-functional test pattern to determine whether there is a difference between said output response signals and said expected pattern.

* * * * *